(12) United States Patent
Venkataraghavan et al.

(10) Patent No.: US 11,126,430 B2
(45) Date of Patent: Sep. 21, 2021

(54) VECTOR PROCESSOR FOR HETEROGENEOUS DATA STREAMS

(71) Applicant: Intel Corporation, Santa Clara, CA (US)

(72) Inventors: Parakalan Venkataraghavan, Bangalore (IN); Thomas W. Smith, Colmar, PA (US); Silpa Naidu Chirumavilla, Bangalore (IN); Ravi Shekhar, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/729,253

(22) Filed: Dec. 27, 2019

(65) Prior Publication Data
US 2020/0356368 A1    Nov. 12, 2020

(51) Int. Cl.
*G06F 9/30*     (2018.01)
*G06F 9/38*     (2018.01)

(52) U.S. Cl.
CPC ...... *G06F 9/30036* (2013.01); *G06F 9/30065* (2013.01); *G06F 9/3877* (2013.01)

(58) Field of Classification Search
None
See application file for complete search history.

(56) References Cited

U.S. PATENT DOCUMENTS

| | | | | |
|---|---|---|---|---|
| 4,162,534 A * | 7/1979 | Barnes | ............... | G06F 7/762 712/7 |
| 8,069,190 B2 * | 11/2011 | McColl | ............... | G06F 16/2465 707/805 |
| 9,602,437 B1 * | 3/2017 | Bernath | ............... | H04L 49/90 |
| 2008/0282034 A1 * | 11/2008 | Jiao | ............... | G06F 9/3836 711/125 |
| 2013/0103829 A1 * | 4/2013 | Doi | ............... | H04L 43/04 709/224 |
| 2013/0290943 A1 * | 10/2013 | Uliel | ............... | G06F 8/30 717/160 |
| 2016/0098455 A1 * | 4/2016 | Curtin | ............... | G06F 16/22 707/738 |
| 2017/0024208 A1 * | 1/2017 | Mahurin | ............... | G06F 9/30072 |

(Continued)

OTHER PUBLICATIONS

Extended European Search Report for EP 20166315.0 dated Jul. 27, 2020, 11 pages.

*Primary Examiner* — Eric Coleman
(74) *Attorney, Agent, or Firm* — Fletcher Yoder, P.C.

(57) ABSTRACT

A vector processor includes a grouping memory functional unit coupled to grouping memory having multiple bins. The vector processor also includes a bitformatting functional unit that performs bit-level data arrangements using any suitable technique or network, such as a Benes network. The vector processor receives and reads an input vector of data that includes portions (e.g., bits) of multiple data streams, and writes each portion corresponding to a respective data stream to a respective bin in parallel using the bitformatting functional unit to align the data. The vector processor also or alternatively receives and reads multiple outgoing data streams, writes portions of the data streams in respective bins of the grouping memory, and intersperses the portions in an outgoing vector of data in parallel, using the bitformatting functional unit to align the data.

21 Claims, 9 Drawing Sheets

(56) References Cited

U.S. PATENT DOCUMENTS

2017/0177351 A1    6/2017  Ould-Ahmed-Vall
2017/0177353 A1*  6/2017  Ould-Ahmed-Vall ........................ G06F 9/30112

* cited by examiner

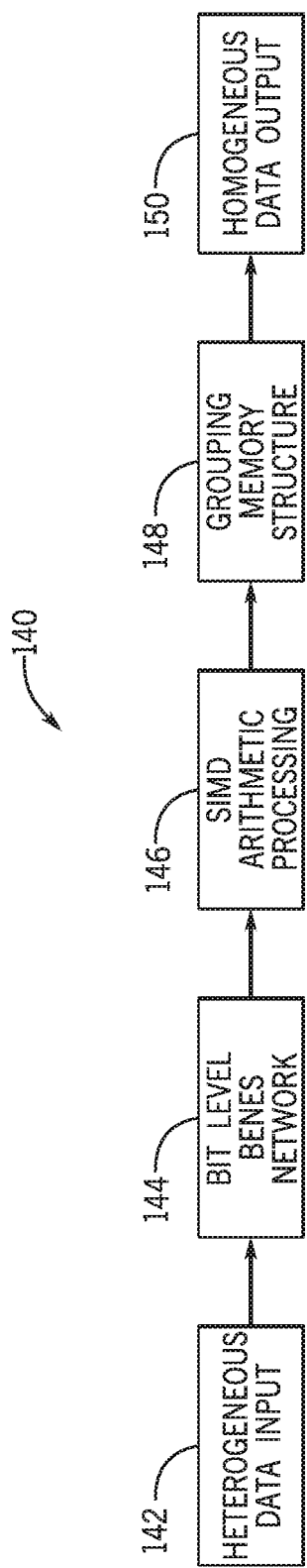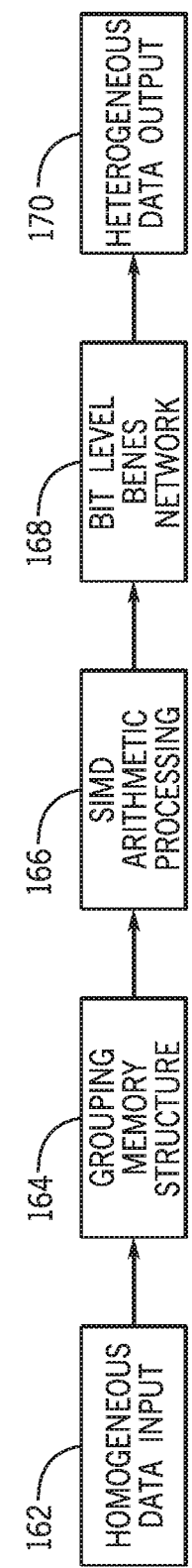

VECTOR PROCESSOR FOR HETEROGENEOUS DATA STREAMS

BACKGROUND

This disclosure relates generally to heterogeneous data, and more particularly to parallel processing of the heterogeneous data.

This section is intended to introduce the reader to various aspects of art that may be related to aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

When receiving certain input, such as when operating using certain communications networks (e.g., 4G cellular network, 5G cellular network, mmWave), vectors of data may be received and transmitted that are made up of multiple streams of data. While each stream of data may be of the same format, compression schemes, packing schemes, and so on (thus referred to as a homogeneous data stream), the received or transmitted vector may include multiple streams of data having different formats, compression schemes, packing schemes, and so on, with samples from multiple streams possibly being interleaved and arranged in different possible orders, depending upon the data packing format specified in the communication protocol (thus collectively referred to as a heterogeneous vector or data stream).

Upon receipt of the heterogeneous vector, a receiving device may separate portions (e.g., bits) of data from received vector and re-form them into their original respective homogeneous streams. Further processing may take place using these resulting homogeneous data streams. Similarly, a transmitting device may combine portions of data from multiple homogeneous streams of data into a heterogeneous vector of data (e.g., a byte in length) for transmission to a receiving device. However, serial or sequential processing of a received heterogeneous data stream to re-form the original respective homogeneous streams may be inefficient and slow. Likewise, serial or sequential processing of the various homogeneous streams to form a homogeneous vector for transmission may likewise be inefficient and slow.

BRIEF DESCRIPTION OF THE DRAWINGS

Various aspects of this disclosure may be better understood upon reading the following detailed description and upon reference to the drawings in which:

FIG. 5 is a flow diagram of a process for converting heterogeneous data in input vectors to homogeneous data in grouping memory, according to embodiments of the present disclosure;

FIG. 6 is a flow diagram of a process for converting homogeneous data to heterogeneous data to be output in vectors, according to embodiments of the present disclosure;

DETAILED DESCRIPTION

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

The presently disclosed systems and methods include a vector processor having multiple parallel processing units (e.g., single input multiple data (SIMD) units) coupled to grouping memory having multiple bins. The vector processor may receive and read an input vector of data that includes portions (e.g., bits) of multiple data streams, and write each portion corresponding to a respective data stream to a respective bin in parallel. The vector processor may also or alternatively receive and read multiple outgoing data streams, write portions of the data streams in respective bins of the grouping memory, and intersperse the portions in an outgoing vector of data in parallel.

This may accelerate processing of input and output vectors of data compared to scalar processing (e.g., by a factor of 8 for byte-length vectors). For example, a scalar processor may loop through input vectors of data once for each data stream to determine the portions of data for a data stream, and then write the portions to data words of that data stream.

Instead, the disclosed vector processor may loop through the input vectors once while writing data from the input vectors into a corresponding memory or grouping bin in parallel, providing a more efficient approach that reduces the overhead of multiple loops. Similarly, a scalar processor may loop through data words for each data stream one at a time to determine the portions of data to write to an outgoing vector of data, and then write the portions to the outgoing vector. Instead, the disclosed vector processor may write the data words to corresponding grouping bins and loop through the grouping bins to write data from the grouping bins to the outgoing vector in parallel, providing a more efficient approach that reduces the overhead of multiple loops.

Figure 1:
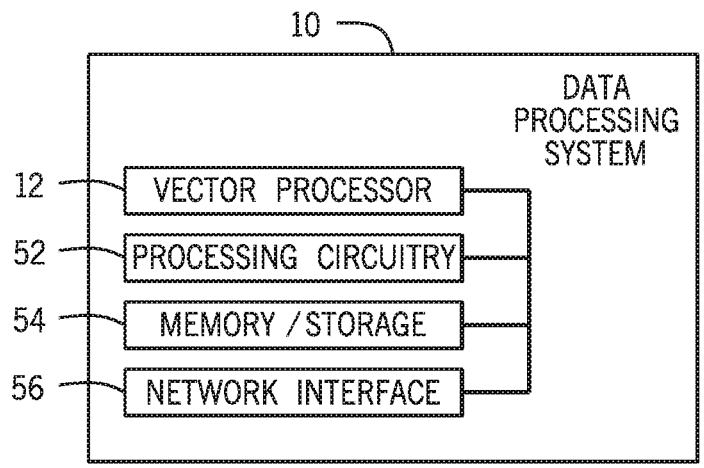
FIG. 1 is a block diagram of a data processing system having a vector processor that processes heterogeneous data streams, according to embodiments of the present disclosure.

By way of introduction, FIG. 1 illustrates a block diagram of a data processing system 10 having a vector processor 12 that processes heterogeneous data streams, according to embodiments of the present disclosure. While the system 10 is illustrated as a data processing system, it should be understood that the system 10 may be any suitable system that implements the vector processor 12 to process heterogeneous data streams, such as a communication system, a networking system, and the like. Moreover, it should be understood that while the vector processor 12 is described in terms of hardware (e.g., processing and/or supporting circuitry), at least some of the vector processor 12 may be implemented in software (e.g., instructions stored in a memory device).

The data processing system 10 may include processing circuitry 52 (e.g., a host processor), memory/storage circuitry 54, and a network interface 56. The data processing system 10 may include more or fewer components (e.g., electronic display, user interface structures, application specific integrated circuits (ASICs)). While the vector processor 12 is illustrated as external to the processing circuitry 52, in some embodiments, the vector processor 12 may be internal to or part of the processing circuitry 52. The processing circuitry 52 may include any additional suitable processors, such as an Intel® Xeon® processor or a reduced-instruction processor (e.g., a reduced instruction set computer (RISC), an Advanced RISC Machine (ARM) processor) that may manage a data processing request for the data processing system 10 (e.g., to perform machine learning, video processing, voice recognition, image recognition, data compression, database search ranking, bioinformatics, network security pattern identification, spatial navigation, or the like).

The memory and/or storage circuitry 54 may include random access memory (RAM), read-only memory (ROM), one or more hard drives, flash memory, or the like, and store data to be processed by the data processing system 10. The network interface 56 may allow the data processing system 10 to communicate with other (e.g., external) electronic devices. The data processing system 10 may include several different packages or may be contained within a single package on a single package substrate.

In one example, the data processing system 10 may be part of a data center that processes a variety of different requests. For instance, the data processing system 10 may receive a data processing request via the network interface 56 to perform machine learning, video processing, voice recognition, image recognition, data compression, database search ranking, bioinformatics, network security pattern identification, spatial navigation, or some other specialized task.

Figure 2:
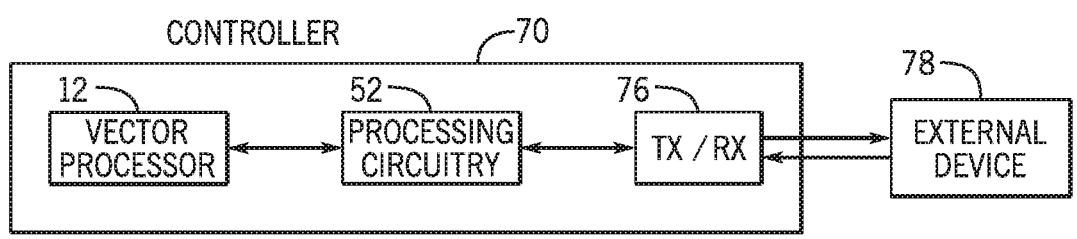
FIG. 2 is a block diagram of a controller having the vector processor of FIG. 1 that processes heterogeneous data streams, according to embodiments of the present disclosure.

FIG. 2 is a block diagram of a controller 70 having the vector processor 12 that processes heterogeneous data streams, according to embodiments of the present disclosure. The controller 70 may be any suitable controller that uses the vector processor 12 that processes heterogeneous data streams, such as a baseband unit, a radio equipment controller, a network controller, a communications controller, a video controller, a graphics controller, a data management controller, and so on. The controller 70 may include the processing circuitry 52 of the data processing system 10, which may be communicatively coupled to the vector processor 12. In some embodiments, the controller 70 may be part of a system on a chip (SoC), such that the processing circuitry 52, the vector processor 12, and other components may be disposed on an integrated circuit or chip.

In some embodiments, the controller 70 may also include or be coupled to a transceiver 76, which may send and receive data, using any suitable communication protocol, to and from an external device 78 separate or apart from the data processing system 10. The transceiver 76 may be part of the network interface 56 of the data processing system 10 of FIG. 1. In some embodiments, the transceiver 76 may be split into a transmitter and a receiver. The transceiver 76 may also be communicatively coupled to the processing circuitry 52, and may send or receive heterogeneous or irregular data to or from the vector processor 12 via the processing circuitry 52. For example, in remote radio heads, data from multiple streams may be packed into an input vector of data, where each stream may include respective data elements having different sizes, alignments, formats, and so on. The format of each data element, portion, or sample may be specified by a specification or configuration. That is, in certain telecommunication systems, communication data associated with multiple data streams may have an irregular data format. While the vector processor 12, the processing circuitry 52, and the transceiver 76 are shown as part of the controller 70, it should be understood that in alternative or additional embodiments, these components may not be contained in or part of the controller 70 (e.g., may be external to the controller 70).

Figure 3:
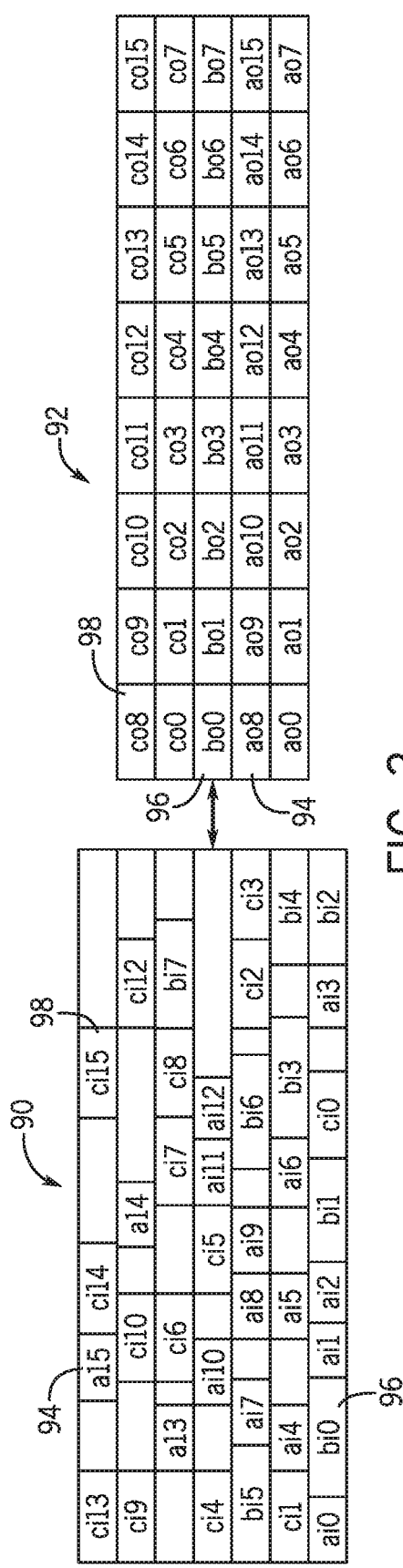
FIG. 3 is a diagram of heterogeneous data and homogeneous data, according to embodiments of the present disclosure.

Each stream of data may vary with compression, specialized packing, and/or data protocols. As such, an input vector of data may be heterogeneous or irregular as it may be made up of data samples having these different characteristics or properties. That is, a heterogeneous data stream may include data samples having different data types, formats, and/or alignments, whereas a homogeneous data stream may include data samples having the same data types, formats, and/or alignments. For the purposes of this disclosure, the terms "heterogeneous" and "irregular" are used interchangeably and mean the same thing. FIG. 3 is a diagram of heterogeneous data 90 and homogeneous data 92, according to embodiments of the present disclosure. As illustrated, the heterogeneous data 90 and the homogeneous data 92 are made up of three different streams of data, stream A (e.g., as represented by data samples starting with the letter "a", of which data sample 94 is an example), stream B (e.g., as represented by data samples starting with the letter "b", of which data sample 96 is an example), and stream C (e.g., as represented by data samples starting with the letter "c", of which data sample 98 is an example).

The vector processor 12 may receive the heterogeneous data 90 from an external source or device 78 via the transceiver 76. The vector processor 12 may convert, organize, or categorize the heterogeneous data 90 into the homogeneous data 92 for use (e.g., by portions of the controller 70). The vector processor 12 may also or alternatively receive the homogeneous data 92 (e.g., from an internal source or component of the controller 70), and convert, organize, or categorize the homogeneous data 92 to the heterogeneous data 90 for transmission (e.g., by the transceiver 76).

Some data processing systems may process input data streams or prepare output data streams having heterogeneous data in a serial manner (e.g., on a per-stream basis). However, with the evolution of high bandwidth radio communication systems (e.g., implementing 4G, 5G, and/or mmWave technologies), single stream processing of data may be insufficient to handle increased data rates. Therefore, parallel processing techniques may be improve performance of processing data streams having heterogeneous data. The vector processor 12 may include single input multiple data (SIMD) very large instruction word (VLIW) processors that process such data streams using parallel processing techniques.

Figure 4:
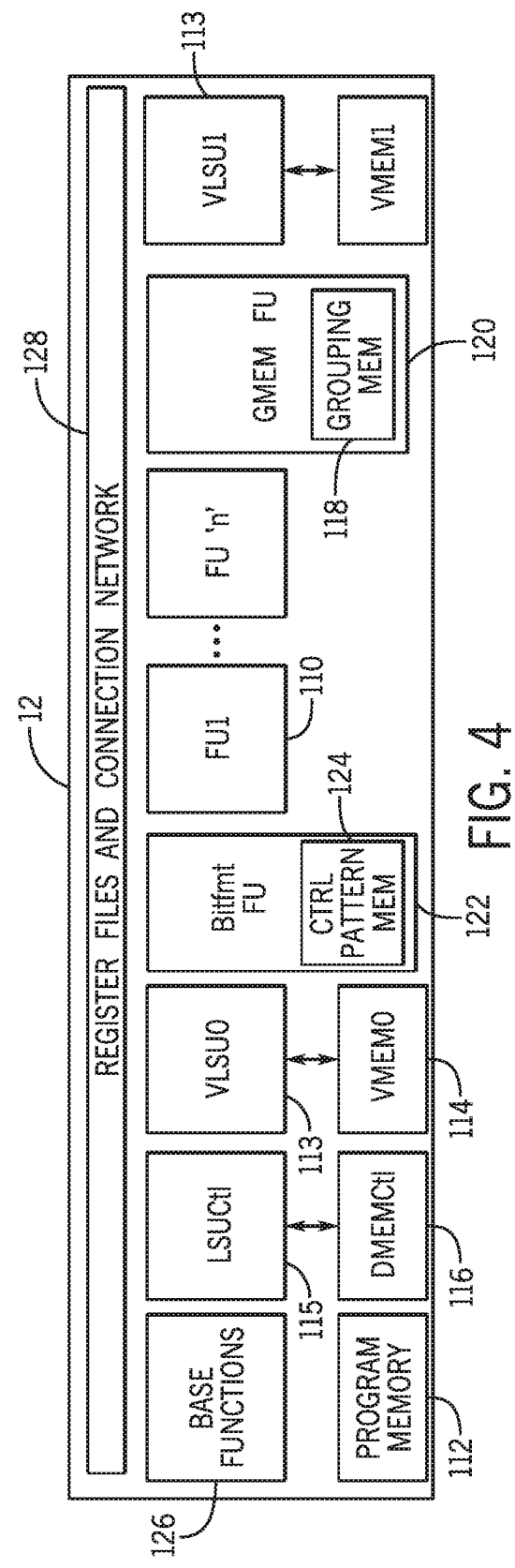
FIG. 4 is a block diagram of an example of the vector processor of FIG. 1 and hardware components supporting the vector processor, according to embodiments of the present disclosure.

FIG. 4 is a block diagram of an example of the vector processor 12 and hardware components supporting the vector processor 12, according to embodiments of the present disclosure. The illustrated vector processor 12 may include multiple parallel scalar and single input multiple data functional units 110 (labeled "FU1", "FU2", . . . , "FU'n'") that perform arithmetic operations, logic operations, or any other suitable data processing operations, provided as a set of instructions, which may be stored in program memory 112. While the program memory 112 is illustrated as part of the vector processor 12, in additional or alternative embodiments, the program memory 112 may be external to and support the vector processor 12. The illustrated vector processor 12 may also include vector load and store units 113 that transfer data from and/or to vector memory blocks 114 (labeled "VMEM0", "VMEM1") that store input and/or output data. The illustrated vector processor 12 may include a load-store unit controller 115 (labeled "LSUCtl") that executes load and store instructions, generates virtual addresses of load and store operations, and/or loads data from or stores data to memory blocks 116 (labeled "DMEMCtl") that store control data.

The illustrated vector processor 12 may also include grouping memory 118 used to store data to be processed from input vectors or as output vectors. The grouping memory 118 may be part of the grouping memory functional unit (labeled "GMEM FU") 120. The grouping memory functional unit 120 may be a single input multiple data functional unit (e.g., 110), that writes data samples to the multiple bins in parallel, and/or reads data sample from the multiple bins in parallel. The grouping memory 118 may include multiple bins and each bin, which may be one vector wide, can hold data samples belonging to one single stream. The illustrated vector processor 12 may also include a bitformatting functional unit 122 (labeled "Bitfmt FU"), which may include a control pattern memory 124 (labeled "Ctrl Pattern Mem"). The bitformatting functional unit 122 may perform bit-level data arrangements using any suitable technique or network, such as a Benes network. The control pattern memory 124 may enable flexible (e.g., reconfigurable, programmable) functionality to change heterogeneous data streams to homogeneous data streams, and vice versa, as explained in further detail below. As illustrated, the vector processor 12 also includes base functions 126 that facilitate operation of the vector processor 12, and register files and connection network storage and functionality 128. While the register files and connection network storage and functionality 128 is illustrated as part of the vector processor 12, in additional or alternative embodiments, the register files and connection network storage and functionality 128 may be external to and support the vector processor 12.

The vector processor 12 may write data samples from different streams stored in a single input vector to different bins of the grouping memory 118 to produce homogeneous data. FIG. 5 is a flow diagram of a process 140 for converting heterogeneous data in input vectors to homogeneous data in the grouping memory 118, according to embodiments of the present disclosure. While the process 140 is described using steps in a specific sequence, it should be understood that the present disclosure contemplates that the described steps may be performed in different sequences than the sequence illustrated, and certain described steps may be skipped or not performed altogether. In some embodiments, the process 140 may be implemented by executing instructions stored in a tangible, non-transitory, computer-readable medium, such as the memory/storage circuitry 54, the program memory 112, and/or the control pattern memory 124, using a processor, such as the processing circuitry 52 and/or the vector processor 12.

As illustrated, in process block 142, the processing circuitry 52 and/or the vector processor 12 receives the heterogeneous data input. In particular, the heterogeneous data input may include multiple data samples of different data types in an input vector of data. The input vector may be any suitable size, such as one word or byte (e.g., eight bits) long. The input vector may be received via the transceiver 76.

In process block 144, the processing circuitry 52 and/or the vector processor 12 may apply a bit-level Benes Network (e.g., as implemented by the bitformatting functional unit 122) to determine which data stream each data sample belongs to, and align the data samples belonging to the same data stream. In process blocks 146 and 148, the processing circuitry 52 and/or the vector processor 12 may use the grouping memory functional unit 120 to employ single input multiple data arithmetic processing to write the data samples into grouping memory 118 corresponding to the multiple data streams in parallel (e.g., simultaneously or at the same or approximately the same time, as opposed to sequentially or serially). In process block 150, the processing circuitry 52 and/or the vector processor 12 may use the grouping memory functional unit 120 to read the data samples stored in the grouping memory 118 to output homogeneous data. In this manner, the process 140 may enable the processing circuitry 52 and/or the vector processor 12 to align the data samples in their original stream form using parallel processing techniques.

The vector processor 12 may also or alternatively read and combine data samples from different bins of the grouping memory 118 into a single output vector when receiving homogeneous data input (e.g., from an internal source of the controller 70). FIG. 6 is a flow diagram of a process 160 for converting homogeneous data to heterogeneous data to be output in vectors, according to embodiments of the present disclosure. While the process 160 is described using steps in a specific sequence, it should be understood that the present disclosure contemplates that the described steps may be performed in different sequences than the sequence illustrated, and certain described steps may be skipped or not performed altogether. In some embodiments, the process 160 may be implemented by executing instructions stored in a tangible, non-transitory, computer-readable medium, such as the memory/storage circuitry 54, the program memory 112, and/or the control pattern memory 124, using a processor, such as the processing circuitry 52 and/or the vector processor 12.

As illustrated, in process block 162, the processing circuitry 52 and/or the vector processor 12 receives the homogeneous data input. In particular, the homogeneous data input may include multiple streams of data samples, wherein each stream is of the same data type, format, and/or alignment. The homogeneous data input may be sent from, for example, an internal source within the controller 70. In process block 164, the processing circuitry 52 and/or the vector processor 12 stores the homogeneous data input into the grouping memory 118. In particular, each bin of the grouping memory 118 may correspond to a data stream, such that samples from the stream may be stored in the same bin or bins.

In process blocks 166 and 168, the processing circuitry 52 and/or the vector processor 12 may use the output of the grouping memory functional unit 120 to employ single input multiple data arithmetic processing and a bit-level Benes Network (e.g., as implemented by the bitformatting functional unit 122) to write data samples from multiple bins (e.g., that may correspond to different data streams) to an output vector in parallel (e.g., simultaneously or at the same or approximately the same time, as opposed to sequentially or serially). In process block 170, the processing circuitry 52 and/or the vector processor 12 may send the output vector to a recipient (e.g., a device 78 external to the controller 70). In this manner, the process 160 may enable the processing circuitry 52 and/or the vector processor 12 to generate output vectors having heterogeneous data for output using parallel processing techniques.

Figure 7:
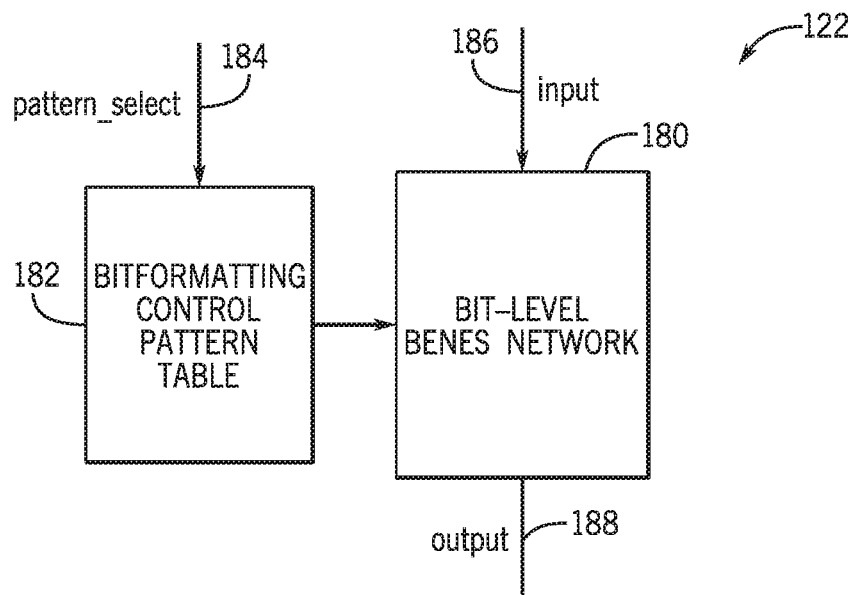
FIG. 7 is a block diagram of a bitformatting functional unit of the vector processor of FIG. 4, according to embodiments of the present disclosure.

FIG. 7 is a block diagram of the bitformatting functional unit 122, according to embodiments of the present disclosure. The bitformatting functional unit 122 may include a bit-level Benes network 180, which may include a butterfly (e.g., one source to many destinations) and/or an inverse butterfly (e.g., multiple sources to one destination) network, that provides arbitrary permutations and rearrangements of data. While the presently disclosed systems and methods are discussed as using a bit-level Benes network 180, other circuit topologies, including Clos networks or crossbars, may perform bit-level formatting. As employed herein, the bit-level Benes network 180 may generate bit-level permutations and/or arrangements of data, as controlled by a bitformatting control pattern table 182, which may be stored in the control pattern memory 124.

The bit-level Benes network 180 may permute and align data samples to regular and/or recognized (e.g., byte, half word, and word) boundaries based on control patterns (which may be selected by a selection signal labeled "pattern select" 184) stored in the control pattern table 182, when receiving heterogeneous data input 186 (labeled "input"). Additionally or alternatively, the bit-level Benes network 180 may permute and align data samples to any suitable output format based on the control patterns stored in the control pattern table 182 when generating heterogeneous data output 188 (labeled "output").

The control patterns may define how data samples from certain data streams should be permuted or aligned based on the format, alignment, and/or size of a data sample in a data stream. That is, the control patterns may be precomputed based on a format specification (e.g., of a data stream). In general, a number of control patterns may be stored in the control pattern table 182, and an appropriate control pattern for each stream or data input or output may be selected. In some embodiments, the selection of a control pattern corresponding to a respective stream may be preselected (e.g., prior to runtime), while in additional or alternative embodiments, the selection may be made at run time. The control pattern table 182 may be reinitialized at the start of processing input and/or output vectors to support different sets of formatting types or specifications. It should be noted that the bit-level Benes network 180 may also perform de-interleaving and alignment of the data streams to a regular boundary. In some situations, the bit-level Benes network 180 may also facilitate compression and/or decompression of data streams by handling (e.g., adding, removing, editing) redundancy bits, compression exponents, and/or error checking bits. In this manner, the control pattern table 182 may enable the bit-level Benes network 180 to identify a data stream to which a data sample belongs (e.g., associate data samples with data streams), and thus read the data sample from an input vector or write the data sample to an output vector.

Figure 8:
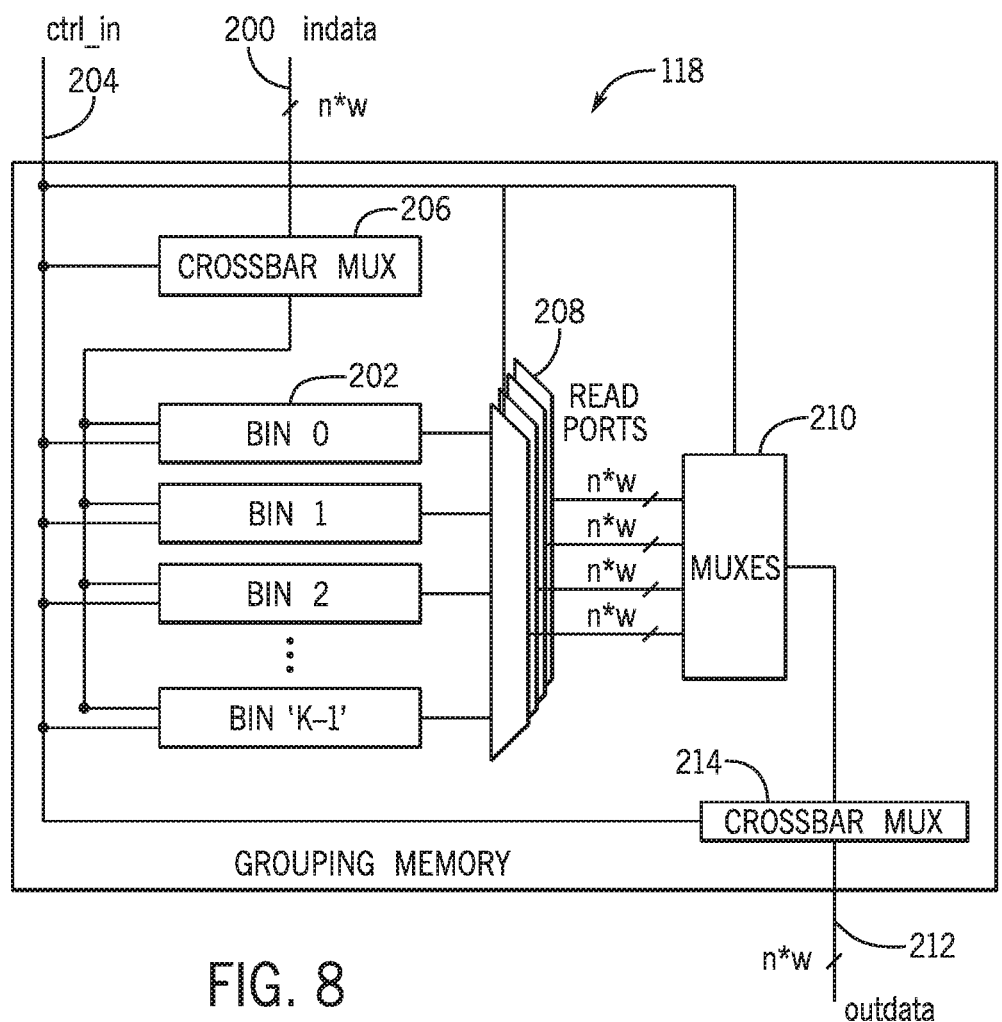
FIG. 8 is a circuit diagram of grouping memory of the vector processor of FIG. 4, according to embodiments of the present disclosure.

FIG. 8 is a circuit diagram of the grouping memory 118, according to embodiments of the present disclosure. The grouping memory 118 may be a specialized memory architecture that employs flip-flops and logic circuitry. The grouping memory 118 may arrange the incoming data 200 (labeled "indata") (e.g., on the order of n times a word-length or byte) in a series of bins 202 based on a control signal 204 (labeled "ctrl_in") (e.g., sent by the bitformatting functional unit 122) and a crossbar multiplexer 206, wherein each bin 202 may be associated with a stream of data. In some embodiments, control signals 204 may store units (e.g., bits, words, bytes, or half words) of data from a common data stream in a common bin when receiving heterogeneous data input. Control signals 204 may also or alternatively cause the grouping memory 118 to scramble data units from different data streams based on the specification of the heterogeneous data output when producing heterogeneous data output. Data (e.g., on the order of n times a word-length or byte) may be read (and removed) from the bins 202 via read ports 208 and selected using element-wide multiplexers 210, and output 212 (labeled "outdata") (e.g., on the order of n times a word-length or byte) using crossbar multiplexer 214 (e.g., as controlled by a control signal 204).

Figure 9:
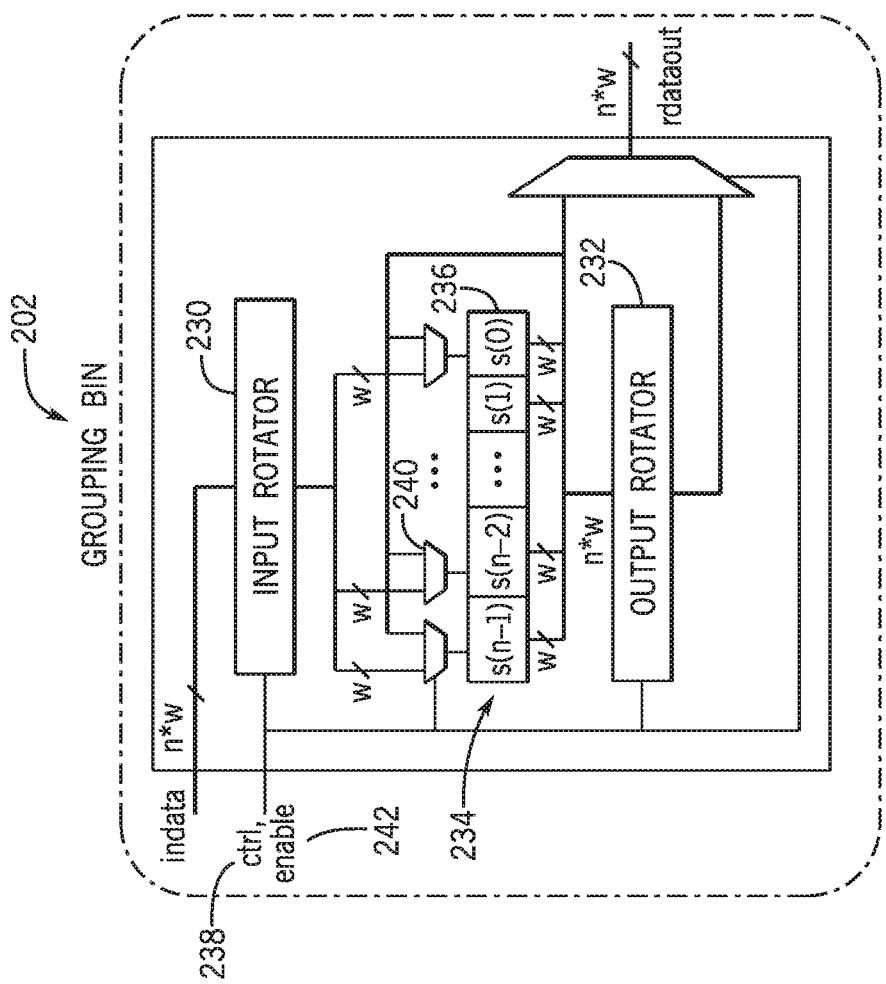
FIG. 9 is a circuit diagram of a grouping bin of the grouping memory of FIG. 8, according to embodiments of the present disclosure.

FIG. 9 is a circuit diagram of a grouping bin 202, according to embodiments of the present disclosure. As illustrated, the grouping bin 202 may operate as a logical first-in first-out (FIFO) buffer on a per-stream basis. The grouping bin 202 may include input rotator circuitry 230, output rotator circuitry 232, and a FIFO buffer 234 having multiple flip-flops 236. A control signal 238 (labeled "ctrl") may select data that is output by the grouping bin 202 via multiplexers 240. Also illustrated is an enable signal 242 (labeled "enable") that may enable the input rotator circuitry 230, the output rotator circuitry 232, and/or the multiplexers 240. While circuitry may maintain a state of the grouping bin 202 (e.g., via read pointers, write pointers), the state of the grouping bin 202 may be additionally or alternatively determined (e.g., at each iteration of using the grouping bin 202) by control generator software, and may be translated and provided to the grouping memory 118 via the control signal ctrl_in 204 shown in FIG. 8.

The bin 202 may provide temporary storage during processing of data samples as inputs and/or outputs. As described herein, the grouping memory functional unit 120 may perform the operations described below on the grouping memory 118 (e.g., based on instructions stored in any suitable medium, such as the program memory 112), though any suitable processor, such as the processing circuitry 52, is contemplated to perform the described operations. In particular, the grouping memory functional unit 120 may "evict" the grouping bin 202 by reading and removing the data from the grouping bin 202, when the processing circuitry 52 determines that the amount of data stored in the bin 202 exceeds a threshold. For example, in some embodiments, the processing circuitry 52 may determine that the grouping bin 202 is full and/or cannot store additional data, and thus may instruct the grouping memory functional unit 120 to evict the data stored in the bin 202. In additional or alternative embodiments, the grouping memory functional unit 120 may evict the bin 202 when new or additional data cannot be stored in an existing bin 202 and all available bins 202 of the grouping memory 118 are occupied. The data from the evicted bin may then be used for subsequent processing by any of the functional units F1 . . . FU'n' 110, the bitformatting functional unit Bitfmt FU 122, and/or storage into the vector memory blocks VMEM0,VMEM1 114

The grouping memory 118 may operate in at least two different modes. The 1Read-M-Write mode, which may be used for grouping when receiving heterogeneous data input, and the 1Write-M-Read mode, which may be used for scrambling (e.g., "ungrouping") to generate heterogeneous data output. In the 1Read-M-Write mode, the grouping memory 118 may read one grouping bin 202 and perform a partial write of 'M' bins 202 in parallel (e.g., simultaneously or at the same or approximately the same time, as opposed to sequentially or serially). In the 1Write-M-Read mode, the grouping memory 118 may read multiple bins 202 (e.g., all the bins 202) and perform write operations sample-by-sample to scramble the data samples in an output vector. In general, the number of bins 202 may be selected based on the number of streams and/or distributions (e.g., of data samples in an output vector). For example, there may be one bin 202, two bins 202, or any other suitable number of bins 202 for each stream.

Figure 10:
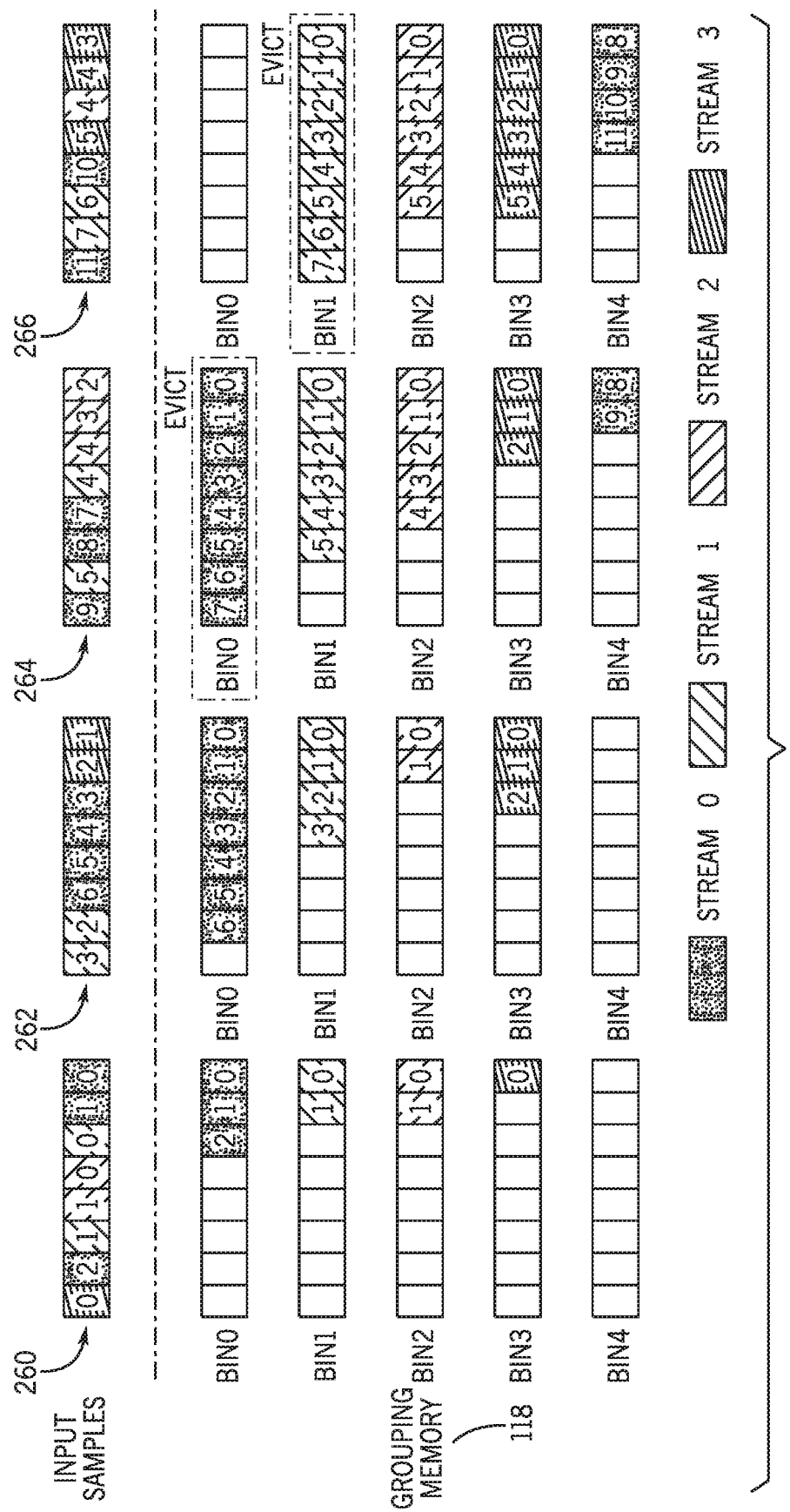
FIG. 10 is a diagram of the grouping memory of FIG. 8 operating in a 1Read-M-Write mode, according to embodiments of the present disclosure.

FIG. 10 is a diagram of the grouping memory 118 operating in the 1Read-M-Write mode, according to embodiments of the present disclosure. In particular, FIG. 10 illustrates how data samples are read from input vectors and written to the grouping bins 202 based on data streams. A first input vector 260 (e.g., which may be stored in a common bin of the grouping memory 118) includes a data sample (e.g., bit 0) from data Stream 0, data samples (e.g., bits 0, 1, 2) from data Stream 1, data samples (e.g., bits 0, 1) from data Stream 2, and data samples (e.g., bits 0, 1) from data stream Stream 3. As illustrated, data samples or bits of each data stream in the first input vector 260 may be non-contiguous.

As illustrated, the grouping memory functional unit 120 writes the data samples stored in the first input vector 260 into the grouping bins 202 based on the data streams associated with the data samples in parallel (e.g., simultaneously or at the same or approximately the same time, as opposed to sequentially or serially). In particular, Bin 0 corresponds to Stream 0, Bin 1 corresponds to Stream 1, Bin 2 corresponds to Stream 2, and Bin 3 corresponds to Stream 3. As such, the grouping memory functional unit 120 writes the data sample (e.g., bit 0) from data Stream 0 into Bin 0, the data samples (e.g., bits 0, 1, 2) from data Stream 1 into Bin 1, the data samples (e.g., bits 0, 1) from data Stream 2 into Bin 2, and the data samples (e.g., bits 0, 1) from data stream Stream 3 into Bin 3 in parallel. The grouping memory functional unit 120 similarly writes the data samples stored in second input vector 262, third input vector 264, and fourth input vector 266 into the grouping bins 202 based on the data streams associated with the data samples in parallel.

When the processing circuitry 52 determines that a grouping bin 202 has reached a threshold storage amount (e.g., by executing software which may precompute a state of fullness of each grouping bin 202, and determine which grouping bin(s) 202 to evict), such as when the grouping bin 202 is full, then the processing circuitry 52 may instruct the grouping memory functional unit 120 to evict the grouping bin 202. In some embodiments, the processing circuitry 52 may write to software control headers that correspond to evicting one or more grouping bins 202, and the grouping memory functional unit 120 may evict those grouping bins 202. As illustrated, during processing of the third input vector 264, Bin 0 reaches a threshold storage amount (e.g., becomes full). As such, the grouping memory functional unit 120 may evict Bin 0 by reading the data samples from Bin 0 and/or writing the data samples to the program memory 112, and remove the data samples from Bin 0. Similarly, during processing of the fourth input vector 266, Bin 1 reaches a threshold storage amount and, as such, the grouping memory functional unit 120 evicts Bin 1. As illustrated, additional grouping bins 202, such as Bin 4, may be assigned to store data samples from streams when available bins (e.g., Bin 1) for those streams are full. This assignment may be made at runtime. Furthermore, while only five grouping bins 202 are illustrated in FIG. 10, it should be understood that the grouping memory 118 may have any suitable number of grouping bins 202.

Moreover, while the example above describes evicting a grouping bin 202 when the grouping bin 202 is full, it should be understood that a grouping bin 202 may be evicted when any suitable threshold fullness of the grouping bin 202 is reached. That is, the processing circuitry 52 may evict a grouping bin 202 when it is partially full (e.g., between 50-100% full, 75% full, 80% full, 85% full, 90% full, 95% full), when all the samples for the particular stream in that grouping bin 202 have finished arriving, based on a fullness that achieves better overall performance, and so on. Indeed, any suitable algorithm may be devised to that results in more efficient eviction of grouping bins 202 for a particular application. As such, the complexity of bin state management may be moved to offline software (e.g., stored in the memory/storage circuitry 54 of the data processing system 10 to be executed by the processing circuitry 52), freeing up processing resources in the controller 70.

The grouping memory 118 may operate in the 1Write-M-Read mode to facilitate performing the actions of the 1Read-M-Write mode described above in reverse order. In particular, the grouping memory 118 may receive multiple streams of data (e.g., from an internal source or component of the controller 70) that are to be sent to, for example, an external source or device 78 via the transceiver 76. The multiple streams of data may be stored in the grouping bins 202, where each grouping bin 202 may correspond to a stream of data (as shown in FIG. 10). The grouping memory 118 may form output vectors (e.g., 260, 262, 264, 266) by iterating through the grouping bins 202 and writing (and removing) data samples from the grouping bins 202 to the output vectors in parallel (e.g., simultaneously or at the same or approximately the same time, as opposed to sequentially or serially).

Figure 11:
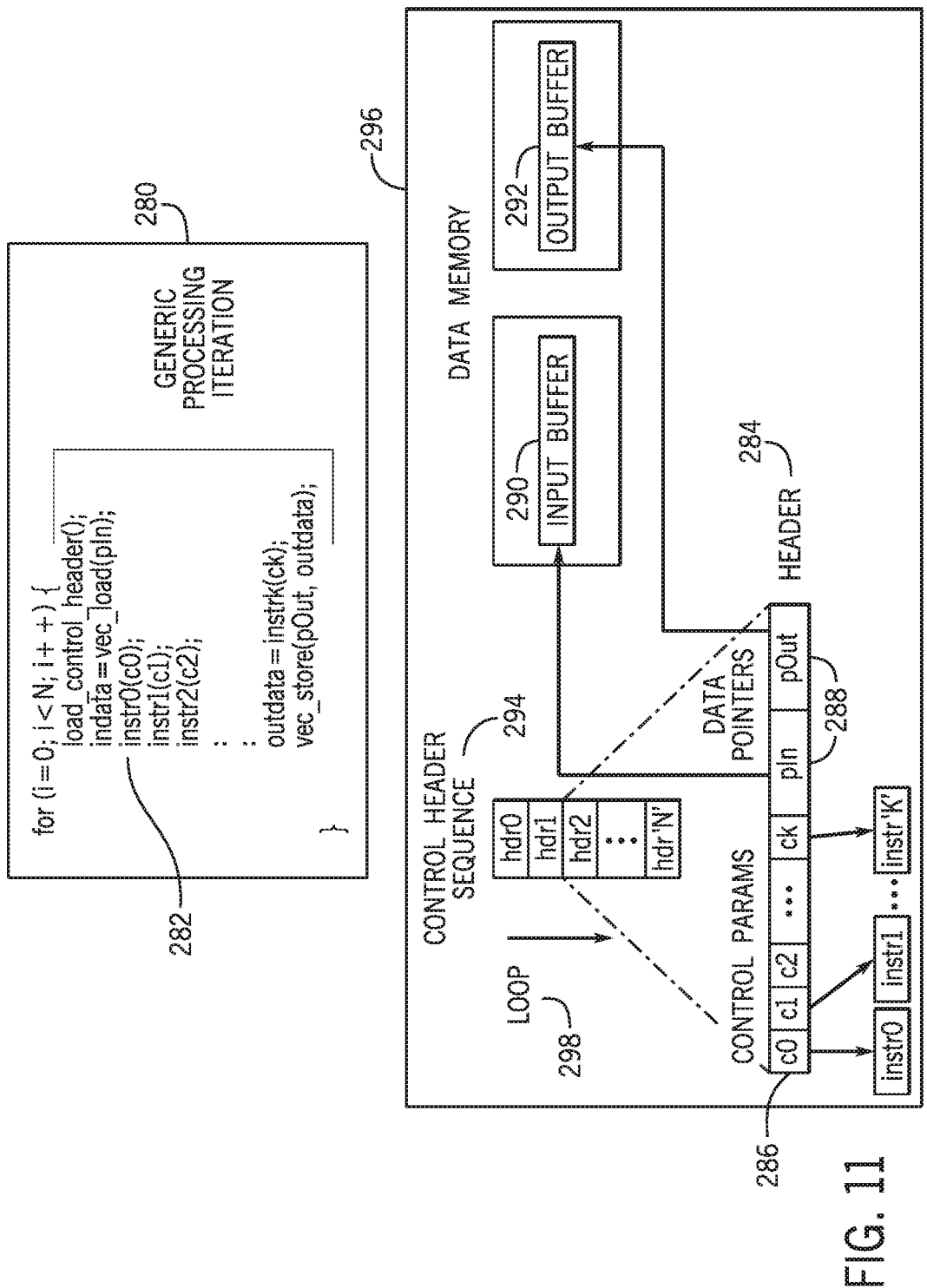
FIG. 11 is an example data processing loop, according to embodiments of the present disclosure.

The vector processor 12 may employ a control header to implement data processing loop techniques to process or generate heterogeneous vectors. FIG. 11 is an example data processing loop, according to embodiments of the present disclosure. The generic processing iteration 280 illustrated FIG. 11 includes a sequence of instructions 282 that may be executed to process a certain amount of input data. The specific behavior for each execution instruction 282 may be defined by a control header 284, which may be a set of control inputs 286 for each instruction 282. As illustrated, the vector processor 12 may generate a control header 284 for the instructions 282 in the generic processing iteration 280. The control header 284 may include pointers 288 to input data (stored in an input buffer 290), output data (stored in an output buffer 292), coefficients, and/or controls for each instruction 282 of the iteration 280. In general, any processing loop may be implemented as a loop of generic processing iterations 280, and the loop of generic processing iterations 280 may have a corresponding control header sequence 294. The headers 284 may be stored sequentially in memory 296 (e.g., the program memory 112) and processed in a loop 298. The execution of the loop 298 may be software pipelined. By performing data processing loops such as that illustrated in FIG. 11, the amount of overhead associated with the execution of instructions 282 may be reduced. Such implementation may be suitable in situations in which a total number of execution calls is not particularly high and where the control memory requirements are manageable. Examples of such situation include radio heads, in which the input block sizes per-stream may be small to meet low latency requirements.

Figure 12:
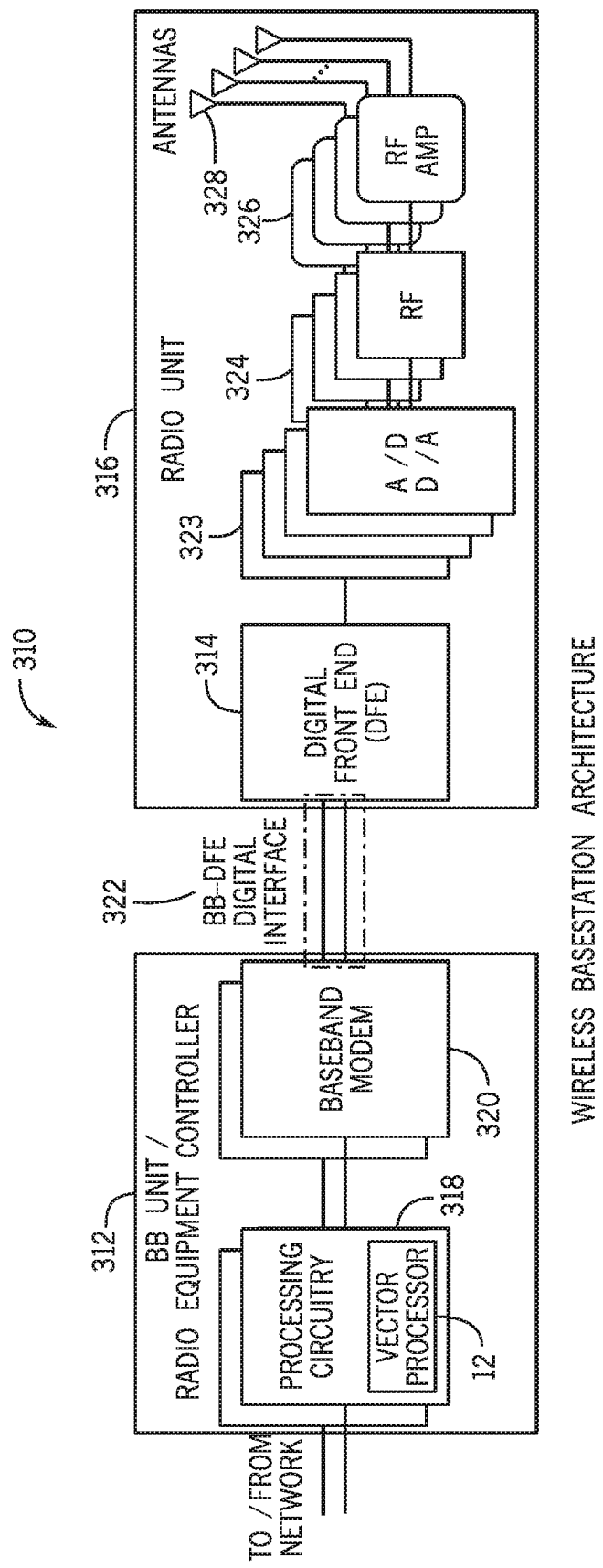
FIG. 12 is a block diagram of wireless base station architecture that may employ the vector processor of FIG. 4, according to embodiments of the present disclosure.

In some embodiments, the vector processor 12 may be employed in communication infrastructure, such as in wireless base station architecture 310 as illustrated in FIG. 12. Specifically, the vector processor 12 may perform operations that mediate interaction between baseband unit (e.g., radio equipment controller 312) and a digital front end 314 of a radio unit 316. For example, the baseband unit 312 may include processing circuitry 318 that includes the vector processor 12, and one or more baseband modems. The vector processor 12 may process incoming or outgoing heterogeneous vectors to implement certain functionalities and protocols, such as the common public radio interface (CPRI), radio access network (RAN), open RAN (oRAN), virtualized RAN (vRAN), or extensible RAN (xRAN), thus increasing the speed and efficiency of processing data in the form of heterogeneous vectors. A baseband modem 320 may send heterogeneous vectors of data (e.g., that include data samples from multiple, different data streams) to and from the vector processor 12.

A baseband-digital front end digital interface 322 may transfer the heterogeneous vectors of data between the baseband modem 320 of the baseband unit 312 and the digital front end 314 of the radio unit 316. The digital front end 314 may send the heterogeneous vectors of data to and receive homogeneous vectors of data (e.g., to be converted to the heterogeneous vectors of data) from analog-to-digital (labeled "A/D") and/or digital-to-analog (labeled "D/A") converters 323, which may be coupled to radio frequency units 324 and radio frequency amplifiers 326. Antennas 328 coupled to the radio frequency amplifiers 326 may send or receive the heterogeneous vectors of data to and from devices external to the wireless base station architecture 310 using any suitable wireless communication protocol. As such, the radio unit 316 may be an example of an external device 78, as shown in FIG. 2, separate or apart from a data processing system 10 (e.g., the baseband unit 312).

Figure 13:
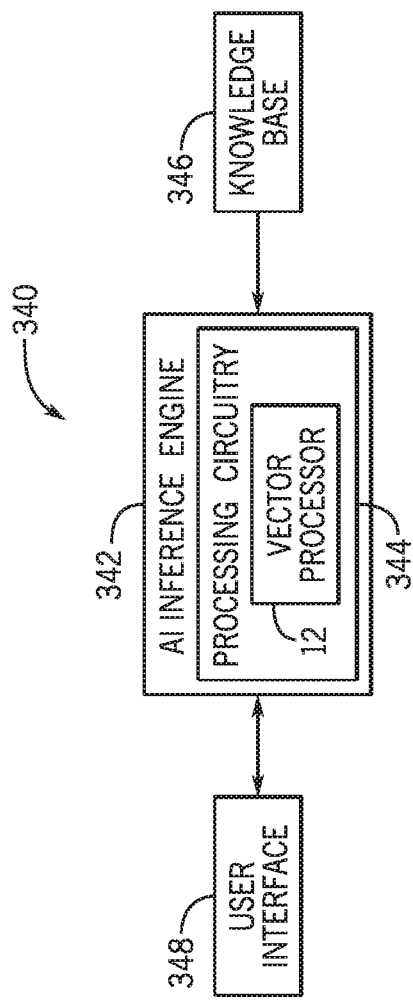
FIG. 13 is a block diagram of an artificial intelligence inferencing system that may employ the vector processor of FIG. 4, according to embodiments of the present disclosure.

In additional or alternative embodiments, the vector processor 12 may be incorporated in an artificial intelligence inferencing system 340, as illustrated in FIG. 13. Specifically, an artificial intelligence inference engine 342 may include processing circuitry 344 that receives training data from a knowledge base 346, and causes the artificial intelligence inference engine 342 to learn from repetitive iterations of using the training data to develop more accurate results. In particular, the processing circuitry 344 may include the vector processor 12, which may receive the training data from the knowledge base 346 in the form of heterogeneous vectors. The vector processor 12 may convert the heterogeneous vectors of training data into homogeneous vectors for use by the artificial intelligence inference engine 342. In this manner, the vector processor 12 may increase efficiency of processing data in the form of heterogeneous vectors for the artificial intelligence inference engine 342, thus increasing the speed of training the artificial intelligence inference engine 342. The artificial intelligence inference engine 342 may output results or predictions to a user interface 348, which may also serve to input user commands or preferences. As such, the knowledge base 346 may be an example of an external device 78, as shown in FIG. 2, separate or apart from a data processing system 10 (e.g., the artificial intelligence inference engine 342).

Figure 14:
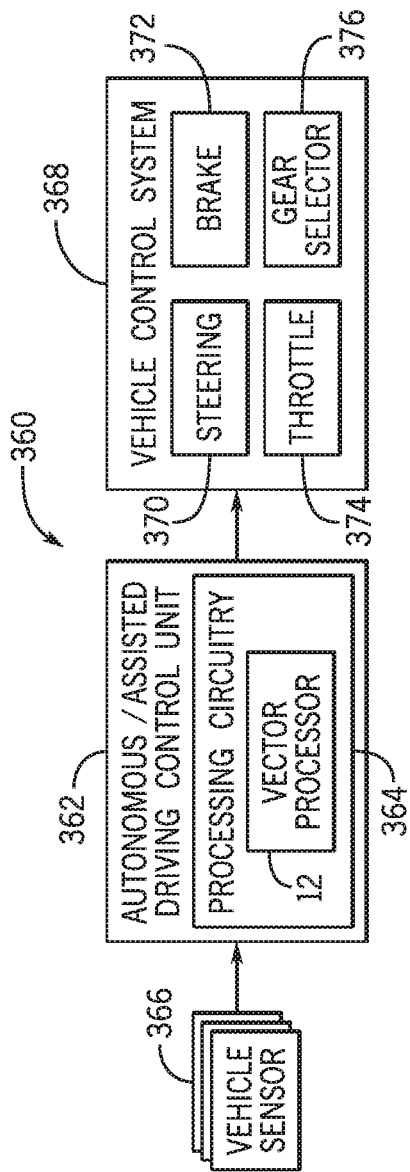
FIG. 14 is a block diagram of an autonomous or assisted driving system that may employ the vector processor of FIG. 4, according to embodiments of the present disclosure.

In yet another embodiment, the vector processor 12 may be incorporated in an autonomous or assisted driving system 360, as illustrated in FIG. 14. Specifically, an autonomous or assisted driving control unit 362 may include processing circuitry 364 that receives sensor information from one or more vehicle sensors 366. For example, the vehicle sensors 366 may include a proximity sensor, accelerometer, location sensor, camera, tire pressure sensor, humidity sensor, temperature sensor, and so on. In particular, the processing circuitry 364 may include the vector processor 12, which may receive the sensor information from the one or more vehicle sensors 366 in the form of heterogeneous vectors. The vector processor 12 may convert the heterogeneous vectors of sensor information into homogeneous vectors for use by the autonomous or assisted driving control unit 362. In this manner, the vector processor 12 may increase the efficiency of processing data in the form of heterogeneous vectors for the autonomous or assisted driving control unit 362, thus increasing the speed of processing sensor information. The autonomous or assisted driving control unit 362 may control a vehicle control system 368 based on the processed sensor information. That is, the autonomous or assisted driving control unit 362 may operate a steering control 370, a brake 372, a throttle 374, and/or a gear selector 376 to cause a vehicle to turn, change speed, stop, accelerate, and so on. In some embodiments, the vector processor 12 may convert homogeneous control data to heterogeneous data, which may be processed by and used to control the vehicle control system 368. As such, the vector processor 12 may increase the speed of controlling the vehicle control system 368 (e.g., in normal operation or to perform evasive or incident avoiding actions). Accordingly, the vehicle sensors 366 and/or the vehicle control system 368 may be examples of external devices 78, as shown in FIG. 2, separate or apart from a data processing system 10 (e.g., the autonomous or assisted driving control unit 362).

It should be understood the disclosed examples are not limiting, and that the vector processor 12 may be employed in any suitable system or application.

While the embodiments set forth in the present disclosure may be susceptible to various modifications, implementations, and/or alternative forms, specific embodiments have been shown by way of example in the drawings and have been described in detail herein. However, it may be understood that the disclosure is not intended to be limited to the particular forms disclosed. The disclosure is to cover all modifications, implementations, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A vector processor to receive a vector of heterogeneous data from or send the vector of heterogeneous data to a device, wherein the heterogeneous data includes a plurality of data samples, at least some of the data samples of the plurality of data samples having different data types, formats, alignments, or any combination thereof, and wherein the vector processor comprises:
   a grouping memory comprising a plurality of bins to store a plurality of aligned data samples of a plurality of homogeneous data streams, wherein each homogeneous data stream of the plurality of homogeneous data streams comprises a same data type, format, alignment or any combination thereof;
   bitformatting circuitry to:
      associate each data sample of the plurality of data samples in the vector of heterogeneous data with a corresponding homogeneous data stream of the plurality of homogeneous data streams; and
      align each data sample of the plurality of data samples belonging to a same homogeneous data stream of the plurality of homogeneous data streams to generate the plurality of aligned data samples; and
   grouping memory circuitry to write the plurality of aligned data samples to corresponding bins of the plurality of bins in parallel.

2. The vector processor of claim 1, wherein the vector processor is to receive the plurality of data samples in one or more input vectors.

3. The vector processor of claim 2, wherein an input vector of the one or more input vectors is one byte in size.

4. The vector processor of claim 1, wherein at least one data sample of the plurality of data samples is one bit in size.

5. The vector processor of claim 1, wherein at least one bin of the plurality of bins is one byte in size.

6. The vector processor of claim 1, comprising a control pattern table to store a plurality of formatting types or specifications of the plurality of homogeneous data streams, wherein the bitformatting circuitry is to associate the plurality of data samples with the plurality of homogeneous data streams based on the plurality of formatting types or specifications stored in the control pattern table.

7. The vector processor of claim 1, comprising a plurality of single input multiple data circuitries to perform arithmetic operations, logic operations, or any other data processing operations.

8. An integrated circuit comprising:
   processing circuitry to receive a first vector of first heterogeneous data from a first device apart from the integrated circuit, and send a second vector of second heterogeneous data to a second apart from the integrated circuit; and
   vector processing circuitry to:
      receive the first vector of first heterogeneous data and generate first homogeneous data streams from the first vector of first heterogeneous data in parallel; and
      receive second homogenous data streams in parallel and generate the second vector of second heterogeneous data.

9. The integrated circuit of claim 8, wherein the vector processing circuitry comprises a plurality of bins to store samples of the first homogeneous data streams.

10. The integrated circuit of claim 9, wherein the vector processing circuitry reads the samples from the plurality of bins and write the samples to an output vector in parallel.

11. The integrated circuit of claim 8, wherein a homogeneous data stream comprises a set of samples having the same size, alignment, format, or any combination thereof.

12. The integrated circuit of claim 8, wherein the vector processing circuitry comprises single input multiple data very large instruction word processors that enable the vector processing circuitry to perform parallel processing techniques on the first vector of first heterogeneous data or the first homogeneous data streams.

13. The integrated circuit of claim 8, wherein the vector processing circuitry employs a control header to implement data processing loop techniques to generate the first homogeneous data streams.

14. The integrated circuit of claim 13, wherein the control header comprises:
   a set of control inputs for instructions to be executed by the vector processing circuitry; and
   pointers to input data and output data.

15. A vector processor comprising:
   grouping memory circuitry;
   a grouping memory comprising a plurality of bins; and
   bitformatting circuitry, wherein the vector processor is to receive a first data sample in a first data arrangement and provide the first data sample in a second data arrangement different from the first data arrangement with respect to one or more data types, formats, alignments, or any combination thereof of the first data sample after execution by the bitformatting circuitry, the grouping memory, and the grouping memory circuitry.

16. The vector processor of claim 15, wherein the first data arrangement comprises a plurality of data samples from a plurality of different data streams, wherein the plurality of data samples comprises the first data sample.

17. The vector processor of claim 16, wherein the plurality of bins comprises a set of bins corresponding to the plurality of different data streams.

18. The vector processor of claim 15, wherein the grouping memory circuitry removes data samples stored in a bin of the plurality of bins when storage of the bin exceeds a threshold storage amount.

19. The vector processor of claim 18, wherein the threshold storage amount comprises a storage capacity of the bin.

20. The vector processor of claim 15, wherein the bitformatting circuitry comprises a Benes network.

21. The vector processor of claim 20, wherein the Benes network is to provide the first data sample in the second data arrangement different from the first data arrangement by permuting the first data sample to predetermined boundaries.

* * * * *